July 26, 1966 V. W. KROAMER ET AL 3,263,207

TRANSISTOR UNDERWATER TELEPHONE SYSTEM

Filed March 27, 1964 2 Sheets-Sheet 1

INVENTORS
HERBERT L. WEST
VERNON W. KROAMER
FRANCIS E. HUFF
BY [signature]
[signature]
ATTORNEYS

TRANSISTOR UNDERWATER TELEPHONE SYSTEM

Filed March 27, 1964 2 Sheets-Sheet 2

INVENTORS
HERBERT L. WEST
VERNON W. KROAMER
FRANCIS E. HUFF
BY
Henry Hansen
W. C. Everett
ATTORNEYS United States Patent Office 3,263,207

Patented July 26, 1966

3,263,207

TRANSISTOR UNDERWATER TELEPHONE SYSTEM

Vernon W. Kroamer, deceased, late of Sellersville, Pa., by Herbert L. West, administrator, Doylestown, Pa., and Herbert L. West, Doylestown, and Francis E. Huff, Hatboro, Pa., assignors to the United States of America as represented by the Secretary of the Navy Filed Mar. 27, 1964, Ser. No. 356,015
5 Claims. (Cl. 340—5)

The invention described herein may be manufactured and used by or for the Government of the United States of America for governmental purposes without the payment of any royalties thereon or therefor.

The present invention relates to a helicopter-borne underwater telephone system capable of operating with presently used underwater telephone systems such as used in submarine or destroyer communication and particularly to be used with the underwater telephone system used for submarine communications identified as Gertrude.

Transmitter-receiver systems used in conjunction with transducers of submarines and destroyers have up until now used vacuum tubes as the amplifying instruments. These vacuum tubes provide durability and high power but have a large amount of weight, take up a large amount of space, require a high heat dissipation and require large power to operate them. In a helicopter desiring to communicate with a submarine, by means of a transducer hung from a cable, it is necessary to have a transmitter-receiver in the helicopter which is light in weight and does not require high power and can be operated on the power supply available in a helicopter. Attempts, however, to adopt the known vacuum tube transmitter-receiver systems to transistor use met with repeated failures for several reasons, all of which have been overcome by the transmitter-receiver of the present invention. It was found, for example, that the long cable leading from the helicopter to the transducer under water frequently picked up electrical biasing effects and was strongly subject to interference from electromagnetic pulse effects which either made noise, blocking out the system, or caused failure of the system entirely.

The general purpose of this invention is to provide a transistorized transmitter-receiver for use in a helicopter in conjunction with a transducer at the end of a cable, which provides the light weight and low power of transistor systems generally and is provided with safeguards against noise and electromagnetic pulse effects. To attain this, the present invention provides a noise blocking phase split and reversal in the receiver and two way voltage limiting devices in both the receiver and transmitter to guard against the effects of electromagnetic pulse effects. A further problem was solved with provision of a transistorized oscillator utilizing germanium transistors providing a low power lightweight stable frequency oscillator for use in the system of the present invention.

Accordingly, it is an object of the present invention to provide a lightweight transistorized transmitter-receiver for use in a helicopter, in conjunction with a cable to a transducer under water, which is guarded against noise and electromagnetic pulse effects by means of phase split and reversal and voltage limiting devices.

Another object of the invention is to provide a transistorized germanium oscillator with a stable frequency operation for use in the modulator of the transmitter receiver of this invention.

Figures 1, 2:
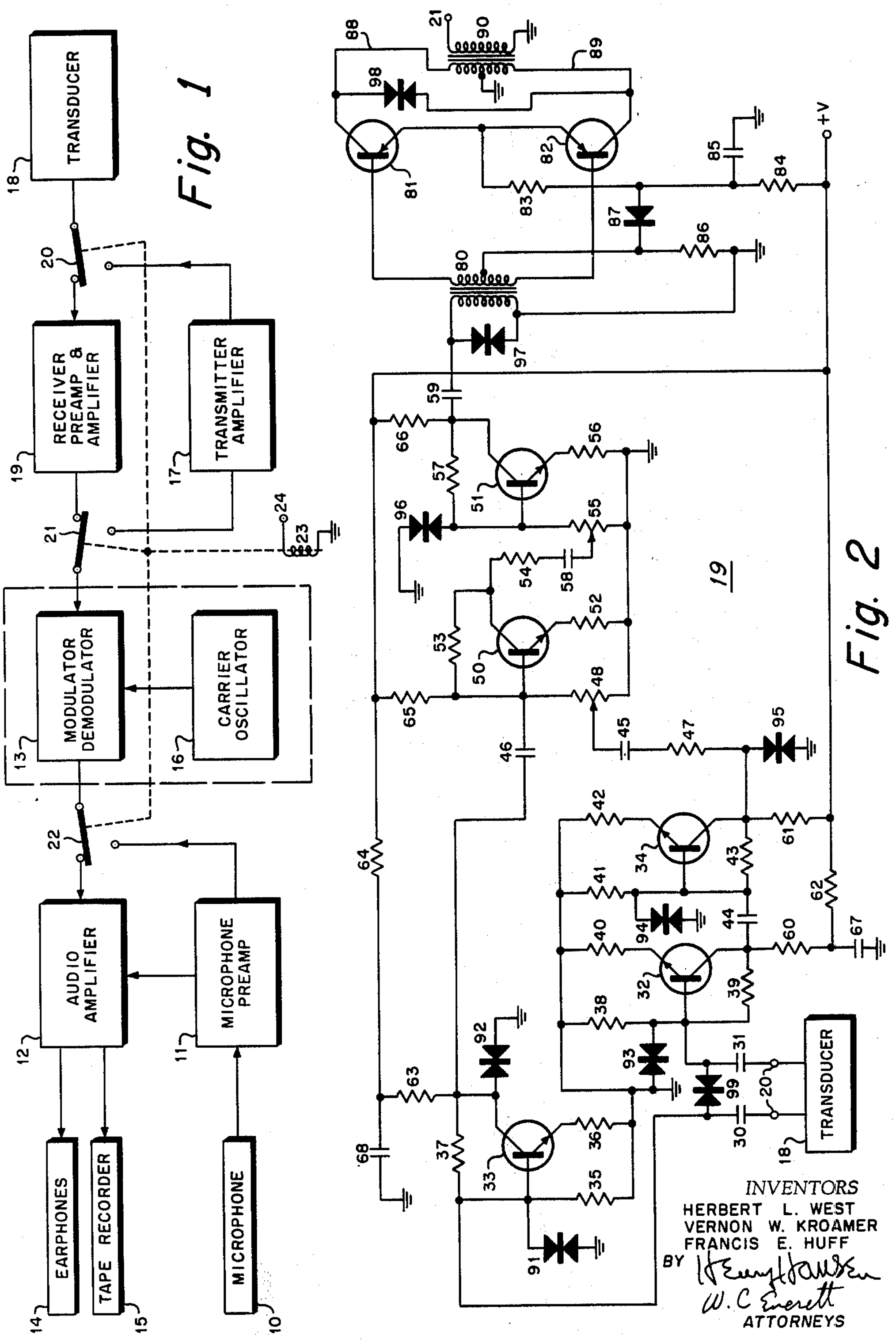
FIG. 1 is a block schematic diagram of a transmitter-receiver system according to the invention.
FIG. 2 shows the circuit diagram of a receiver preamp and amplifier leading to a modulator-demodulator.

The operation of the telephone system may be shown by reference to FIG. 1. A person speaks into a microphone 10. The voice of the user will be ordinarily in the common telephone pass band, which is an acoustic signal of frequency ranging roughly from 300 cycles to 3 kilocycles. The microphone translates this acoustic signal into an electrical signal in the same frequency range. This electrical signal passes to a mike preamp 11. The preamp boosts the signal and passes it to an audio amplifier 12 and a modulator-demodulator 13. The audio amplifier passes the signal to a set of earphones 14 and a tape recorder 15. The modulator-demodulator 13 is a frequency modulator employing a signal from a carrier oscillator 16. Modulator 13 adds the carrier frequency to the incoming signal to produce an output signal which is higher than the input signal by the amount of the carrier frequency. By way of example, let it be assumed that the carrier frequency is 8.075 kilocycles, which is a particular frequency found to be satisfactory in operation. The output signal will then be approximately in the range of 8 kilocycles to 11 kilocycles. This signal then goes to a transmitter amplifier 17 which boosts it to a power level suitable for transmission. This power signal passes to a transducer 18 which converts it into an acoustic signal which is appropriate for transmission through the water. It will be understood that the frequency chosen for transmission through water will be any band of frequencies which is water transmissive, that is, a band of sound waves which is carried through water with low attenuation. The band of 8 kilocycles to 11 kilocycles is suitable but is not the only band so suited. Bands of frequencies up to and over 100 kilocycles may generally be suitable.

When receiving the operation of the system is substantially in reverse. Transducer 18 is resonant in approximately the center of the water transmissive frequency band selected and will convert acoustic signals received in that band to electrical signals in the same band, which it will pass to a receiver preamp and amplifier 19. Amplifier 19 will boost this signal and pass it to modulator-demodulator 13 which will subtract the carrier frequency from the received signal and pass it to audio amplifier 12. This signal which is passed to audio amplifier 12 will be in the common telephone pass band and is passed to earphones 14 and tape recorder 15, as before. Selection between the transmitting and receiving modes is made by switches 20, 21, 22. The switches 20, 21 and 22 are biased in the receiving mode as shown.

They may be pushed to the transmitting mode by the operation of a solenoid 23 operated by a button 24.

The operation of the receiver preamp and amplifier 19 adapted to the present system is illustrated by reference to FIG. 2. Transducer 18 will resonate with the incoming acoustic signal and pass an electrical signal through D.C. blocking capacitances 30 and 31. The two signals are led to the bases of transistors 32, 33; the signal from the transistor 32 is applied to the base of a transistor 34. Inasmuch as one transistor will reverse the phase of the incoming signal 180°, the effect of the two transistors 32, 34 in series will cause that output signal to be in phase with the original incoming signal. Since the two incoming signals are 180° out of phase with each other, the two signals coming from transistor 34 and 33 will, therefore, be in phase with each other. All other signals in the cable or transducer caused, for example, by pulses or noise from the shield on the cable will be canceled as a result of the phase split and reversal through transistors 32, 33 and 34. Transistor 33 is suitably biased and temperature stabilized by resistances 35, 36 and 37. Transistor 32 is biased and temperature stabilized by resistances 38, 39 and 40 and transistor 34 is similarly biased by resistances 41, 42 and 43. D.C. blocking capacitances 44, 45 and 46 are provided along each signal transmitting line. Since the signal from transistors 32 and 34 is double amplified, a resistance 47 and a variable resistance 48 are provided in the signal line to reduce the signal to balance it with the signal from transistor 33. The signal is then fed to the base of a transistor 50 from which another signal is fed out to the base of a transistor 51. Transistor 50 is biased by resistances 48, 52, 53. The signal is fed through line resistance 54. Transistor 51 is suitably biased by resistances 55, 56 and 57. A D.C. blocking capacitance 58 is provided in the line. Resistance 55 is variable and provides the gain control for the amplifier circuit. The signal is fed out through a D.C. blocking capacitance 59. Line resistances 60 through 66 are provided leading to a voltage supply and voltage stabilization capacitances 67 and 68 are provided to ground. Transistors 32, 33, 34, 50 and 51 constitute the preamp section of the receiver amplifier. The signal is fed to the amplifier section through D.C. blocking capacitance 59 into the input coil of a transformer 80. The output coil of transformer 80 leads to the bases of a pair of transistors 81 and 82. Transistors 81 and 82 comprise together a push-pull amplifier with one set of common ends, in this case, emitters connected through resistances 83 and 84 to a voltage supply. A capacitance 85 provides voltage stability to ground. The output coil of transformer 80 is also center tapped through a resistance 86 to ground. A diode 87 is provided for temperature stabilization. It will be understood that resistances 83 and 84 cause transistors 81 and 82 to be biased at cutoff, as is common with push-pull amplifiers. The signal out from transistors 81 and 82 is led through lines 88 and 89 to the input coil of an output transformer 90. Input coil of transformer 90 is center tapped to ground. The output coil of transformer 90 is connected to switch 21 as noted.

Figure 6:
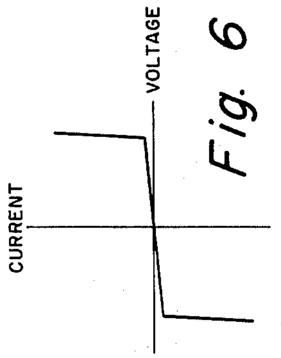
FIG. 6 shows the voltage-current diagram of a double anode zener diode.

To guard against the effects of sudden electromagnetic pulses and other interference which cause the occurrence of localized large voltages in the system and failure of the transistor elements, voltage limiting devices are provided. These voltage limiting devices comprise a set of double anode zener diodes 91 through 99. These diodes have the characteristic of passing very low currents at low voltages, as shown in FIG. 6, but of maintaining a relatively constant voltage over a wide range of current at a higher voltage. The value of the voltage for each diode is set at higher than the maximum expected voltage at each point but lower than the voltage which would cause avalanche breakdown. In ordinary use, none of the diodes draw any substantial current. Diode 98 across the collectors of the push-pull amplifier transistors 81, 82 is the most critical one, as transformer 90 can develop very high reactive voltages in the absence of such a diode.

Figure 3:
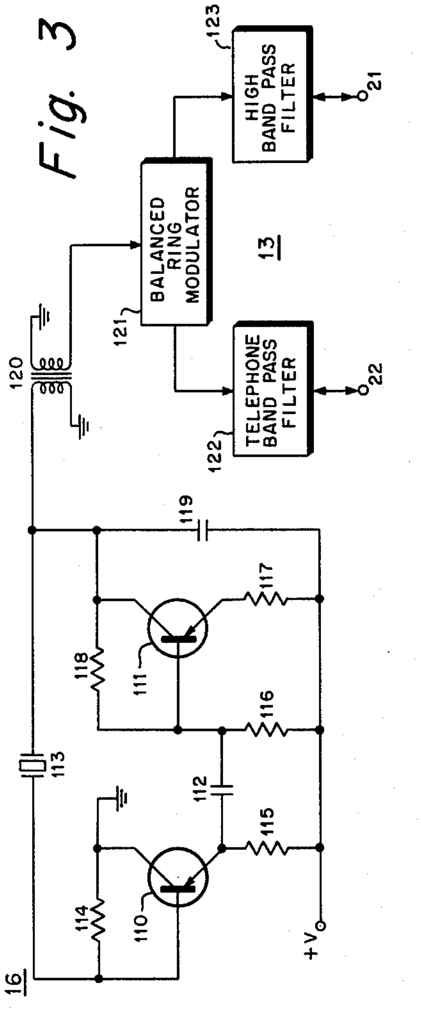
FIG. 3 shows a block schematic diagram of the modulator-demodulator flanked by two upper and lower band filter passes with the circuit diagram of an improved oscillator.

The operation of the oscillator 16 and modulator 13 may be shown by reference to FIG. 3. A germanium transistor 110 is connected in a common collector configuration with a signal issuing from its emitter to the base of a second germanium transistor 111 through capacitance 112. The signal from transistor 111 is taken out from the collector to a crystal 113. This crystal may be, for example, a quartz crystal, which provides a measure of frequency stabilization in the oscillator. The signal is passed back to the base of transistor 110, which provides the positive feedback necessary for oscillation. Resistances 114 through 118 provide biasing and temperature stabilizing means. A capacitance 119 provides coupling between the collector and emitter of transistor 111. The signal is taken out from the collector of transistor 111 to the input coil of a transformer 120. Previous attempts to use germanium transistors in an oscillator of the present type were ineffective because the oscillators produced had a high frequency instability. In the telephone system of the invention a frequency instability of as much as 1 percent will cause substantial distortion of the voice signals received and transmitted. It was discovered that by connecting the first of the transistors in the common collector mode by biasing resistance 114 as shown, the frequency stability of the oscillator was remarkably improved.

The output coil of transformer 120 feeds a signal to a balanced ring modulator 121, which together with a telephone band pass filter 122 and a high band pass filter 123 comprise a modulator-demodulator 13. The telephone band pass filter is a common filter adapted to pass only those frequencies in the common telephone band previously identified. The high band pass filter 123 is a common filter adapted to pass only the band of frequencies previously selected as the water transmissive frequency band. The characteristic of the balanced ring is such that it will produce from an oscillator frequency and an incoming signal a pair of bands, one of which is the sum of the two frequencies and the other of which is the difference of the two frequencies. For example, if a signal in the 8 kilocycles to 11 kilocycles band chosen as an example comes in at switch 21, the high band pass filter will filter out all signals except those in the 8 kilocycles to 11 kilocycles band desired. The balanced ring modulator 121, in conjunction with a carrier frequency of 8.075 kilocycles, will produce two signals, one of which is in the common telephone band, approximately 300 cycles to 3 kilocycles, and the other of which is roughly 16 kilocycles to 19 kilocycles. The telephone band pass filter 122 will allow to pass only the lower band, which is the voice band. This is then fed to switch 22 and the audio amplifier 12. Operating from the opposite direction, if a signal from the microphone comes through switch 22 the telephone band pass filter 122 will filter out all signals other than in the telephone band desired. The balanced ring modulator 121 will produce two signals, one in the 8 kilocycles to 11 kilocycles band and the other in the 5 kilocycles to 8 kilocycles band. The high band pass filter 123 will allow to pass only the upper of those two band, which is the desired output band. Since the sum and difference bands are almost joining in the transmissive mode, it is necessary that the high band pass filter have the characteristic of cutting off very sharply at its lower frequency limit. When selecting a filter to be used in the circuit this factor must be borne in mind. The balanced ring modulator 121 and filters 122 and 123 are commonly known and are shown, for example, by the patent to Gilman 2,362,898.

The audio amplifier 12, mike preamp 11, earphones 14, tape recorder 15 and microphone 10 are common items that need no description.

Figures 4, 5:
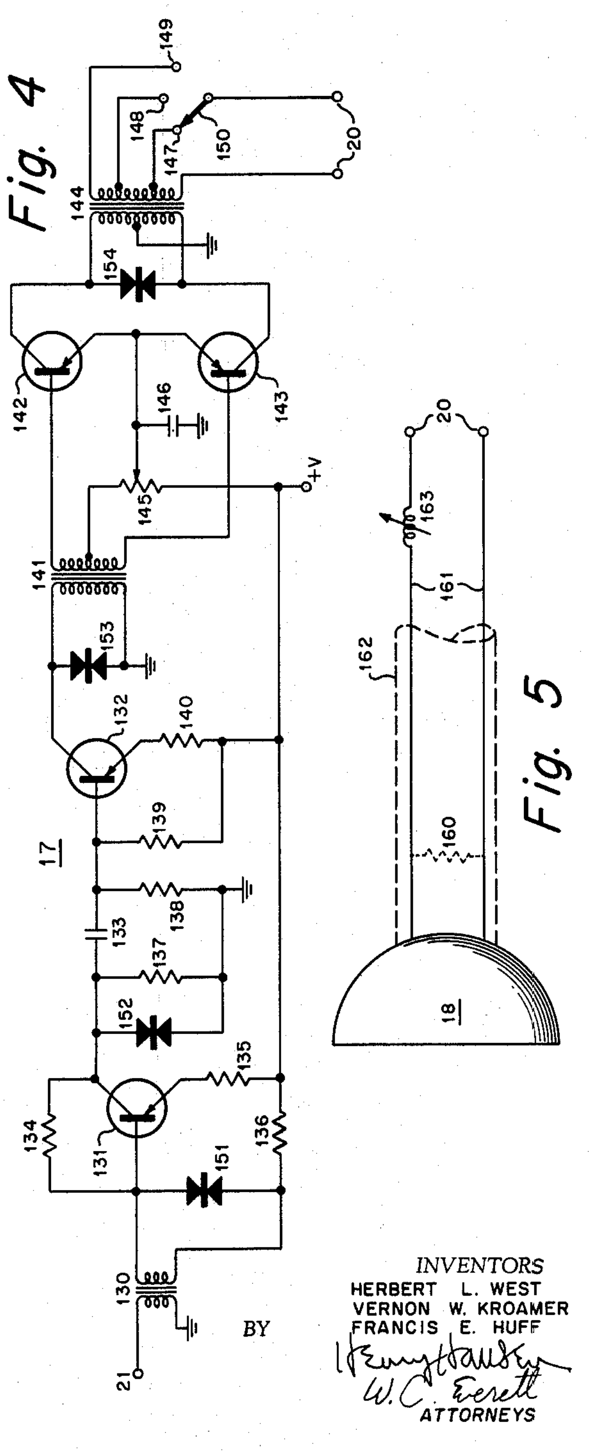
FIG. 4 shows the circuit diagram of a transmitter amplifier.
FIG. 5 shows the schematic drawing of a transducer with equivalent resistance and shielding.

The transmitter amplifier 17 is shown by reference to FIG. 4. The input signal from modulator 13 comes into the base of a transistor 131 through a transformer 130. The signal passes from there to a second transistor 132 through a capacitance 133. Transistors 131 and 132 are suitably biased and temperature stabilized by resistances 134 through 140 and the output signal is passed through a transformer 141 to a pair of transistors 142, 143 arranged in a push-pull configuration. The output signals of transistors 142 and 143 lead to an output transformer 144. A center tap from the output coil of transformer 141 leads through a resistance 145 to a voltage supply. A variable tap on the resistance 145 is linked to the emitters of transistors 142 and 143 which comprise one set of common ends of those transistors. The variable tap on resistance 145 is used to suppress any parasitic E.M.F. which may appear in the transmitter power circuit. This is important as a parasitic E.M.F. which appears in the power circuit can cause the transistors of the push-pull amplifier to operate a subtantial distance from the cutoff point of each. This will cause transformer 144 to operate with a net D.C. voltage through the input coil and if continued at too great a voltage would cause transformer 144 to saturate. Capacitance 146 provides a stabilizing factor. Contact points 147, 148, and 149 may be selectively chosen by switch 150 to match the impedance of transformer 144 to the impedance of the transducer used.

Again, as in the receiver amplifier, voltage limiting means are provided in the transmitter comprising double anode zener diodes 151 through 154. It was found in operation that the transmitter frequently failed. The cause was discovered to be that the high reactive voltages developed across the input coil of transformer 144 from frequencies varying widely from the resonant frequency caused an avalanche breakdown between transistors 142 and 143. Diode 154 limits the maximum voltage which can be developed across transistors 142, 143 as noted in connection with the receiver amplifier. Diodes 151, 152 and 153 guard against the potential effects of very high field electromagnetic pulses such as might emanate from a nuclear weapon.

FIG. 5 shows the representation of the transducer 18 with its equivalent resistance 160, cable 161, cable shield 162, and a variable inductance 163. In a working model of the telephone system of the present invention, the transducer used was an AN/AQS–4 transducer. A transducer of this series has a resonant frequency at about 20 kilocycles. This means that the reactance of the transducer at the 9.6 center kilocycles of the 8 kilocycles to 11 kilocycles water transmissive band used in the working model will be somewhat capacitive. In order to tune the transducer to the 9.6 kilocycles center frequency desired, a variable inductance 163 is connected in series with the cable 161 in the helicopter. It will be understood that the resonant frequency of the transducer may be either above or below the center of frequency of the water transmissive band used and that therefore the variable inductance 163 may be, in necessary cases, a variable capacitance. The cable shield 162 shelters the cable from the effects of water but causes other problems such as the attainment of a net voltage on the cable due to its great length. This must be dealt with by means of the phase split and reversal in the receiver amplifier referred to above.

It will be understood that various configurations may be reversed in the invention. In the amplifier and transmitter circuits, where PNP and NPN transistors are used, the one type may be interchanged with the other type providing the polarity of the voltage supply is correspondingly changed. Where reference is made to a set of common ends of a pair of transistors, it will be understood that this refers to both emitters or both collectors. Other transducers useable besides the AN/AQS–4 are the AN/BQC–1 and AN/UQC–1 series transducers used in present submarine communications. More recently have become available the AN/AQS–5 and AN/AQS–12 programs of transducers. The operational water transmissive band was shown as 8 kilocycles to 11 kilocycles. However, a number of other bands are useable, ranging up to over 100 kilocycles. It will be understood that the frequency of the oscillator will be selected to be the difference between the selected water transmissive band and the common telephone pass band, which is approximately 300 cycles to 3 kilocycles.

Obviously many modifications and variations of the present invention are possible in the light of the above teachings. It is therefore to be understood that within the scope of the appended claims, the invention may be practiced otherwise than as specifically described.

What is claimed is:

1. A helicopter-borne underwater telephone system wherein a transducer is carried under water on a cable extending from the helicopter, said system comprising:

a transmitter-receiver contained in said helicopter;

a transducer means for transmitting an acoustic signal in a water-transmissive frequency band in response to an electrical signal in said band from said transmitter-receiver and for passing to said transmitter-receiver an electrical signal in said band in response to a received acoustic signal in said band;

said transmitter-receiver comprising:

means for providing a carrier frequency which is the difference between said water transmissive frequency band and a common telephone pass band;

first means for receiving an electrical signal in the telephone band converting it to an acoustic signal in the telephone band;

second means for receiving an acoustic signal in the telephone band and converting it to an electrical signal in the telephone band;

modulator-demodulator means for adding said carrier frequency to said electrical signal from said second means and passing it to said transducer and for subtracting said carrier frequency from said electrical signal received from said transducer and passing it to said first means;

reactive means in said helicopter between said transmitter-receiver and said transducer for causing said transducer to be resonant at the center of said water transmissive frequency band;

a transmitter amplifier for passing an electrical signal from said modulator to said transducer after increasing the power level of said signal;

said transmitter amplifier comprising:

a first transformer;

transistor amplifier means for boosting said signal from said modulator and passing it to said first transformer;

a pair of transistors having a first set of common ends joined together to a voltage supply, said first transformer being joined to the bases of said pair of transistors;

a second transformer, said second transformer being connected to a second set of common ends of said transistors;

a two-way voltage limiting means connected in parallel with said second transformer across said second set of common ends of said transistors, said first transformer being center tapped to a voltage supply;

a receiver amplifier for receiving a signal from said reactive means and said transducer and boosting it and passing it to said demodulator, said receiver amplifier comprising:

a pair of transistor amplifier stages for receiving a pair of elecrtical signals from said transducer 180° out of phase with each other, one of said transistor amplifier stages having two transistors in series for reversing the phase of said signal 360° and the other transistor amplifier having one transistor stage for reversing the phase of said signal 180° so as to be in phase with the other of said signals;

means for passing the signals from both said amplifier stages to a third amplifier stage;
a third transformer;
means for applying the signal from said third amplifier stage to said third transformer;
a pair of transistor amplifiers having a first set of common ends joined together to a voltage supply, the bases of said pair of transistors being joined to said third transformer;
a fourth transformer, a second set of common ends of said pair of transistors being joined to said fourth transformer, said transformer being center tapped to ground and having means to pass a signal to said demodulator; and
a two-way voltage limiting means connected in parallel with said fourth transformer across said second set of common ends of said transistors.

2. A telephone system as recited in claim 1 wherein said first transformer is center tapped; a voltage source; a resistance means connected between said center tap of said first transformer and said voltage source, said resistance means having a variable tap connected to said first set of common ends of said transistors.

3. A telephone system as recited in claim 1 wherein said means for providing a carrier frequency comprises:
a first germanium transistor;
a second germanium transistor having its base connected to the emitter of said first transistor;
a crystal connected in series between the collector of said second transistor and the base of said first transistor; and
means for drawing a signal from said collector of said second transistor and passing it to said modulator-demodulator.

4. A helicopter-borne underwater telephone system wherein a transducer is carried underwater on a cable extending from the helicopter, said system comprising:
a receiver contained in said helicopter;
a transducer means for passing to said receiver an electrical signal in a water-transmissive frequency band in response to a received acoustic signal in said band, said receiver comprising means for providing a carrier frequency, which is the difference between said water-transmission frequency band and the common telephone pass band;
means for receiving an electrical signal in the telephone band and converting it to an acoustic signal in the telephone band;
demodulator means for subtracting said carrier frequency from said electrical signal received from said transducer means and passing it to said means for receiving and converting an electrical signal;
reactive means in said helicopter coupled between said receiver and said transducer for causing said transducer to be resonant at the center of said water-transmissive frequency band;
said receiver having a receiver amplifier, said receiver amplifier comprising:
a pair of transistor amplifier stages for receiving a pair of electrical signals from said transducer 180° out of phase with each other, one of said transistor amplifier stages having means for reversing the phase of one of the electrical signals of said pair 180° and the other of said amplifier stages having means for reversing the phase of the other electrical signal of said pair 360° to be in phase with the other electrical signal;
means for passing the signals from both of said amplifier stages to a third amplifier stage;
an output push-pull amplifier stage having means for receiving the signal from said third amplifier stage and having a pair of transistor amplifiers having a first set of commond ends;
a voltage supply source;
means connecting said first set of common ends to said voltage supply source;
output means from said receiver amplifier;
a second set of common ends from said output amplifier;
means connecting said second set of common ends to said output means; and
a two-way voltage limiting means connected between said second set of common ends, said two-way voltage limiting means comprising a double anode zener diode.

5. A helicopter-borne underwater telephone system wherein a transducer is carried under water in a cable extending from a helicopter, said system comprising:
a transducer means for transmitting an acoustic signal in a water-transmissive frequency and in response to an electrical signal in said band and for transmitting an electrical signal in said band in response to an acoustic signal in said band;
transmitter means contained in said helicopter for passing to said transducer means an electrical signal in said band in response to a received acoustic signal in said band;
said transmitter means comprising:
oscillator means for providing a carrier frequency which is the difference between said water-transmissive frequency band and the common telephone passed band wherein said oscillator means includes:
a first germanium transistor;
a second germanium transistor having its base connected to the emitter of said first transistor;
a crystal connected in series between the collector of said second transistor and the base of said first transistor;
first means for receiving an electrical signal in the telephone band and converting it to an acoustic signal in the telephone band;
second means for receiving an acoustic signal in the telephone band and converting it to an electrical signal in the telephone band;
modulator means for adding said carrier frequency to said electrical signal from said second means;
a transmitter amplifier coupled to said modulator means for passing an electrical signal from said modulator means to said transducer means after increasing the power level of said signal;
said transmitter amplifier comprising:
a first transformer;
a first transistor amplifier for boosting said signal from said modulator means and passing it to said first transformer;
a pair of transistors having their emitters joined together and their bases connected to said transformer;
said first transformer having a center tap connected through a resistance to a voltage supply, said resistance having a variable tap connected to the emitters of said pair of transistors;
a second transformer connected to the collectors of said pair of transistors;
a two-way voltage limiting means connected in parallel with said second transformer and between the collectors of said pair of transistors;
demodulator means for subtracting said carrier frequency from said electrical signal received from said transducer;
receiver means contained in said helicopter for passing to said demodulator means an electrical signal in said band in response to a received acoustic signal from said transducer means;
said receiver means comprising a pair of transistor amplifier stages for receiving a pair of electrical signals from said transducer means 180° out of phase with each other, one of said transistor amplifier stages having means for reversing the phase of one of the electrical signals of said pair 180° and the other of said amplifier stages having means for reversing the phase of the other electrical signal of said pair 360° to be in phase with the other signal;

means for passing the signals from both of said amplifier stages to a third amplifier stage;

an output push-pull amplifier stage having means for receiving the signal from said third amplifier stage and having a pair of transistor amplifiers with their emitters joined together to a voltage supply and their collectors connected to an output means;

a two-way voltage limiting means connected between the collectors of said pair of transistor amplifiers and in parallel with said output means; and said transducer means having reactive means therein for causing said transducer to be resonant at the center of said water-transmissive frequency band.

References Cited by the Examiner

UNITED STATES PATENTS

| | | | |
|---|---|---|---|
| 2,400,796 | 5/1946 | Watts et al. | 340—3 |
| 2,980,865 | 4/1961 | Hilbourne | 331—116 |
| 3,015,781 | 1/1962 | Eklov | 330—15 |
| 3,176,262 | 3/1965 | Ehrlich et al. | 340—3 |
| 3,181,115 | 4/1965 | Wainwright | 340—5 |

OTHER REFERENCES

Miller: "An Underwater Communication System," IRE Transactions on Communications Systems, vol. CS–7, No. 4, December 1959, pp. 249–251 relied on.

CHESTER L. JUSTUS, *Primary Examiner.*

R. A. FARLEY, *Assistant Examiner.*